Jan. 24, 1961

W. H. GENICH 2,969,026

CANDY EXTRUDING MACHINE

Filed July 22, 1958

INVENTOR.
WILLIAM H. GENICH

BY

*Philip S. McBean*

ATTORNEY

Jan. 24, 1961

W. H. GENICH 2,969,026

CANDY EXTRUDING MACHINE

Filed July 22, 1958

INVENTOR.
WILLIAM H. GENICH

BY

*Philip S. McJean.*

ATTORNEY

Jan. 24, 1961

W. H. GENICH 2,969,026

CANDY EXTRUDING MACHINE

Filed July 22, 1958

INVENTOR.
WILLIAM H. GENICH
BY
ATTORNEY

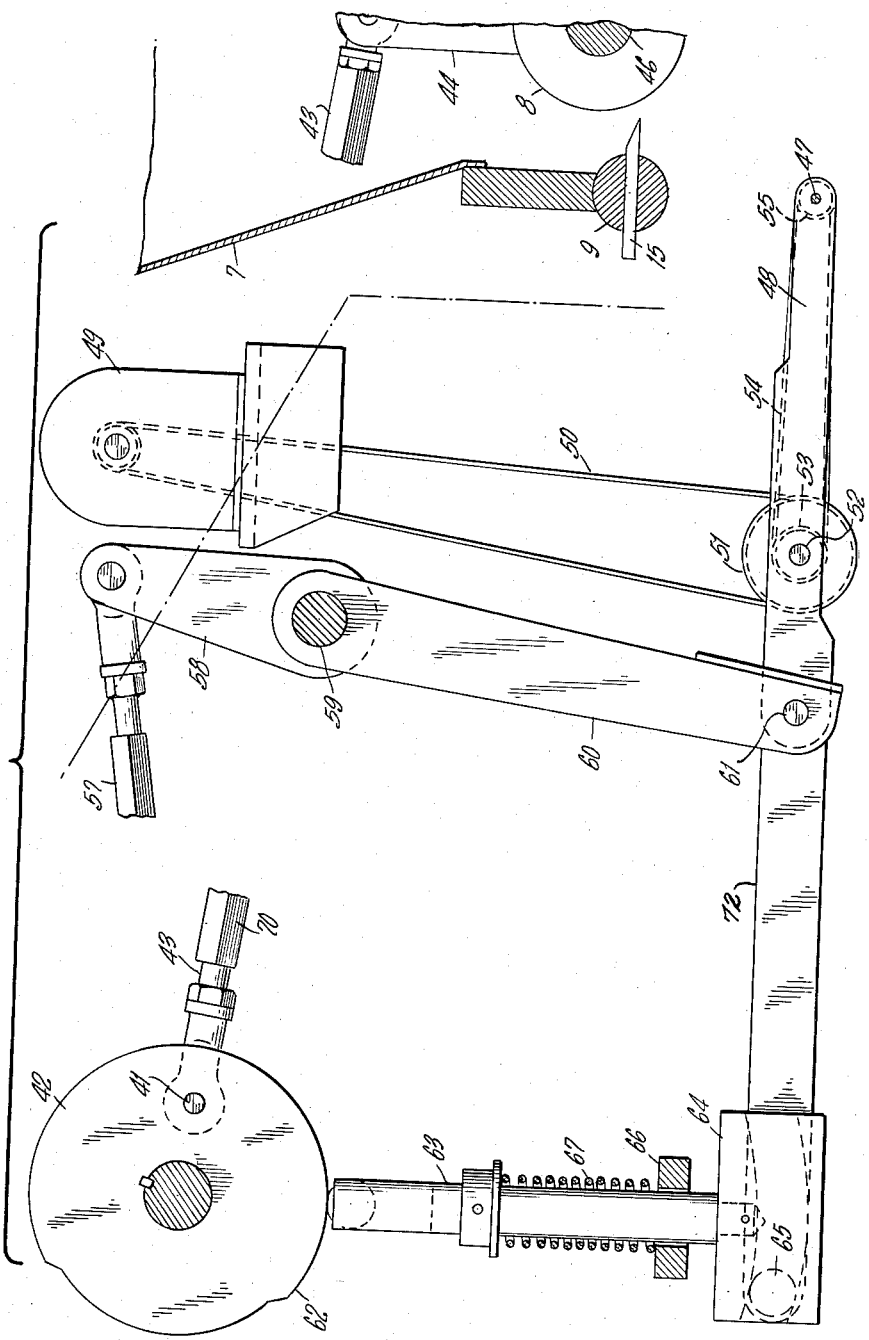

United States Patent Office 2,969,026
Patented Jan. 24, 1961

2,969,026

CANDY EXTRUDING MACHINE

William H. Genich, Racine, Wis., assignor, by mesne assignments, to J. W. Greer Company, Wilmington, Mass., a corporation of Massachusetts Filed July 22, 1958, Ser. No. 750,137

6 Claims. (Cl. 107—29)

The invention herein disclosed relates to machines for extruding and depositing various candy, chocolate, biscuit and other viscous or semi-viscous food products.

Objects of the invention are to avoid objections and faults present in prior machines of this type in which companion feed rolls have been utilized to force the material from a hopper down through openings in a die plate.

In particular, it is a purpose of the invention to provide a machine which will feed the material for candy centers or the like accurately and uniformly and at a desirably high rate of production and which machine will be of a simple sturdy nature, operating positively and effectively.

Special objects of the invention are to provide accurate, self-clearing means for cutting the candy as extruded, in equal amounts.

Other special objects and the novel features through which the purposes of the invention are attained are set forth and will appear in the course of the following specification.

The drawings accompanying and forming part of the specification are illustrative of a present commercial embodiment of the invention but it is realized that structure may be modified and changed as regards such illustration all within the true intent and scope of the invention as hereafter defined and claimed.

Fig. 1 in the drawings is a broken end elevation view of the extruder mechanism.

Fig. 2 is a broken top plan view of the same.

Fig. 3 is an enlarged broken sectional view of the lower portion of the hopper on line 3—3 of Fig. 2 with the expeller blade shown projected in full lines and broken lines indicating how the expeller roll is then rotated to drive that part of the charge separated by the blade down through the die nozzles, broken lines at the bottom indicating the amount discharged and about to be cut off by the rotating wire.

Fig. 5 is a broken and somewhat diagrammatic view illustrating the rotary cut off wire mechanism and the drive for the feed roll.

Figures 3, 4:
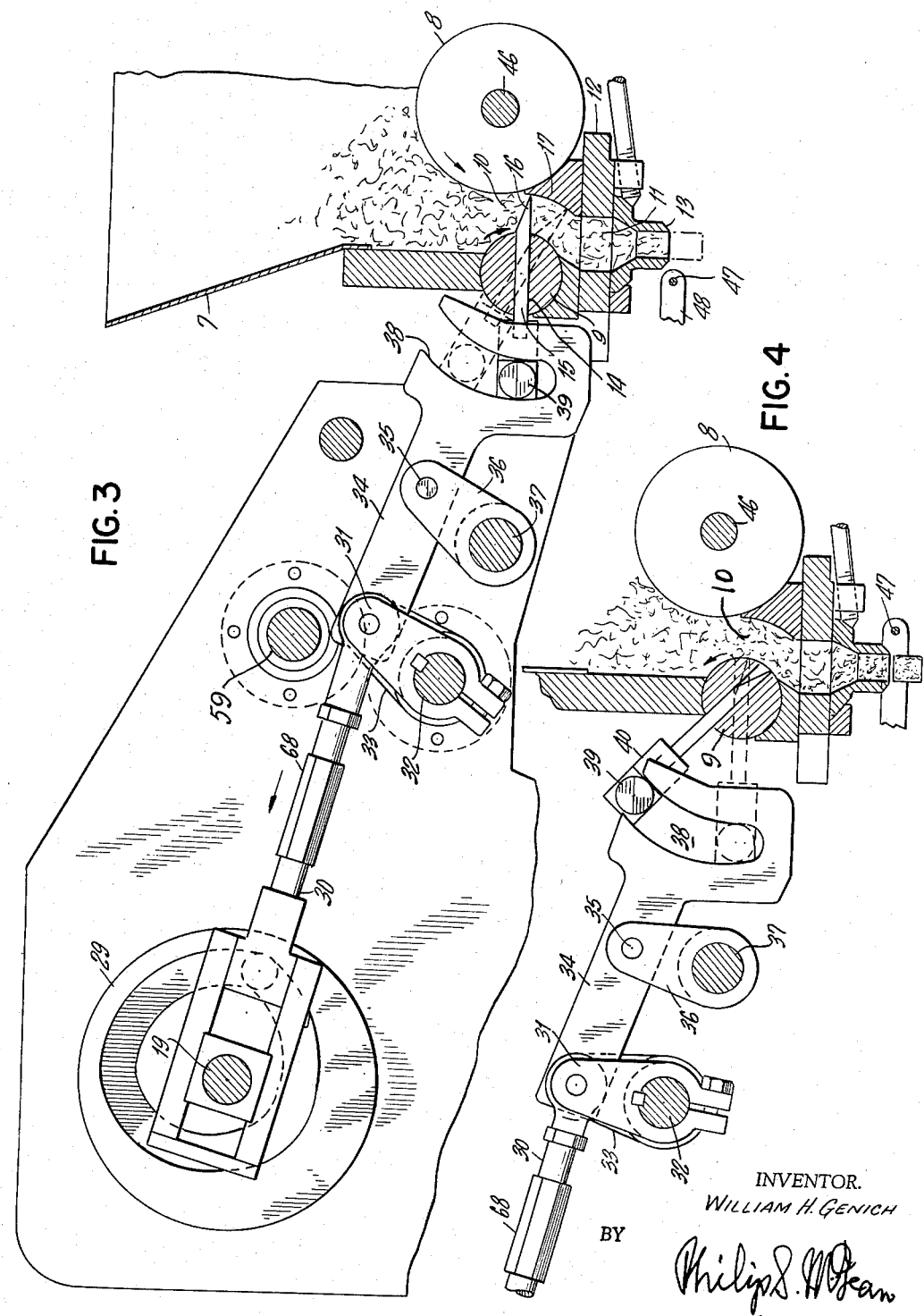
Fig. 4 is a similar view showing the expeller blade retracted at the end of the downward, feed stroke with broken lines indicating return of the blade to horizontal position ready for the next downward feed stroke and the wire advanced after having cut off the extruded charge.

In the embodiment of the invention illustrated there is a hopper 7 for the cream, fondant or other candy material, having at one side a single feed roll 8, fluted or possibly otherwise finished to engage the material and at the opposite side a smaller, expeller roll 9, Fig. 3, the two spaced to provide a pass 10 leading downward to the openings 11 in the die plate 12 and discharge nozzles 13.

The expeller roll 9 is shown as having a diametrical slot 14 therethrough in which there is slidingly guided a feed and cut off blade 15 having a beveled inner edge 16 cooperating with the opposing face of the feed roll and with an arcuate material confining guide 17 opposed to the expeller roll.

Figure 1:
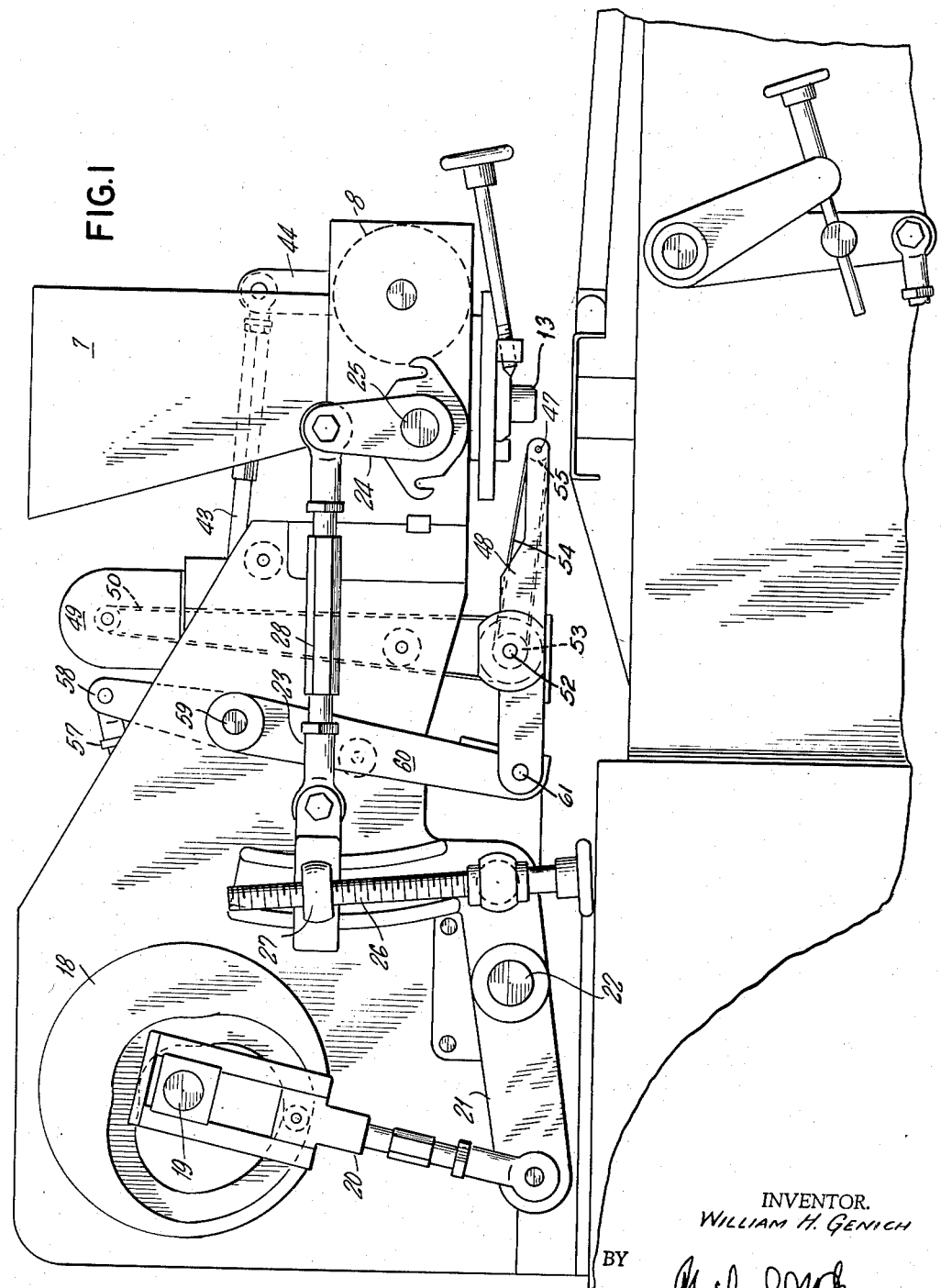
Figure 2:
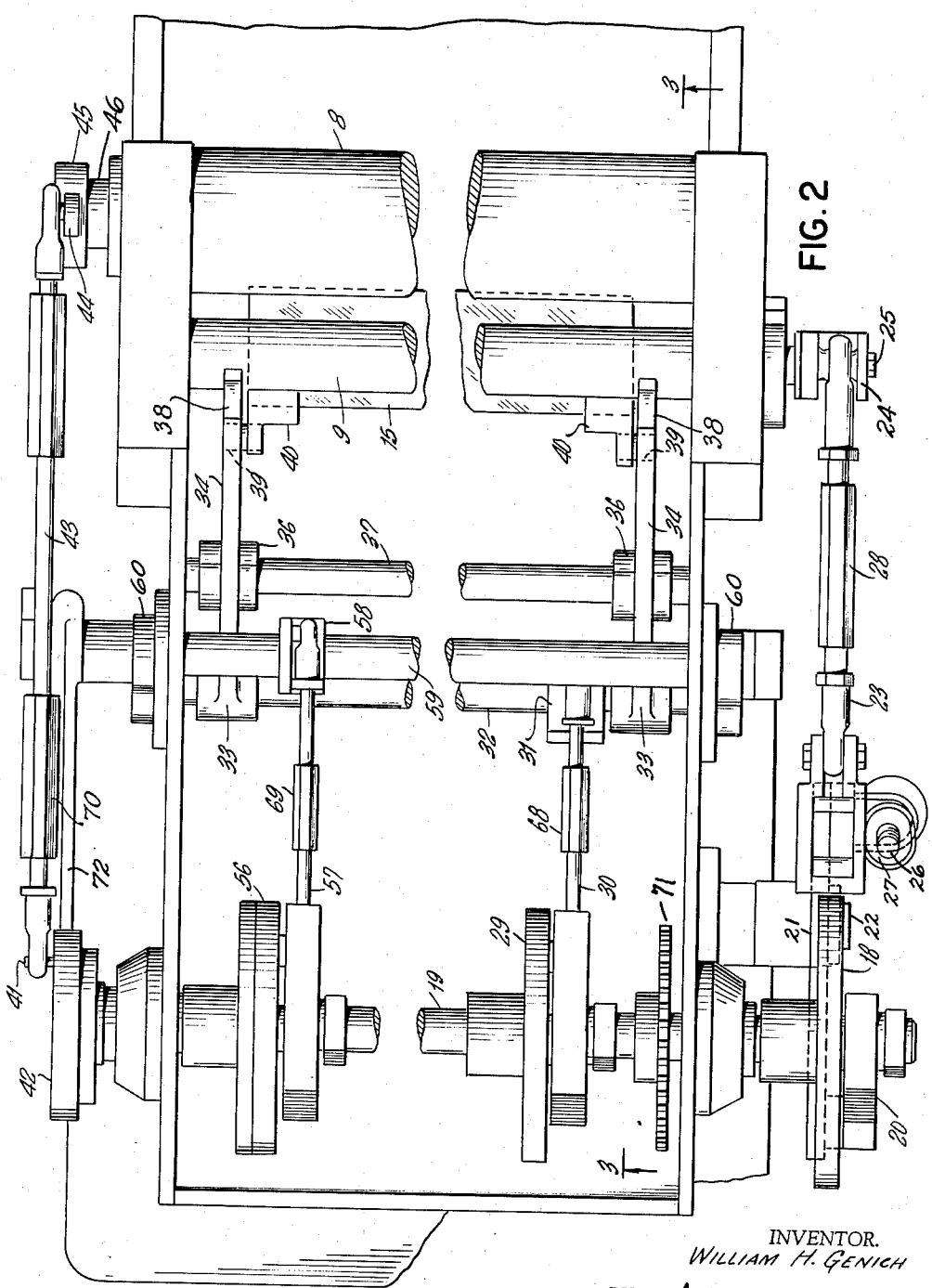

The expeller roll is rocked from a cam 18 on the main drive shaft 19, Figs. 1 and 2, by means of slide link 20 connected with bell crank 21, pivoted on the frame at 22 and connected by pivoted link 23 with rock arm 24 on the shaft 25 of the expeller roll.

The feed stroke of the expeller roll is adjustable in the illustration by hand screw 26 mounted on bell crank 21 and arranged to shift the pivot connection 27 thereon for the drive link 23. A turnbuckle connection 28 in this link enables the expeller roll to be positioned one way or the other to regulate the start and finish positions of the expeller blade.

The expeller blade is projected and retracted by a face cam 29 on the drive shaft operating a slide link 30 pivotally connected with an arm 31, Fig. 3, on rock shaft 32. This rock shaft has arms 33, Fig. 2, at opposite ends of it to which are pivotally connected the blade shifting links 34, the latter pivotally supported at 35 on arms 36 carried by rock shaft 37.

The blade shifting links 34 are shown as having arcuate slots 38 at their lower ends concentric with the expeller roll and receiving the pins or rolls 39 on brackets 40 attached to the ends of the blade.

The feed roll 8 is rocked downwardly in synchronism with the feed stroke of the expeller blade by means of a crank pin 41 on crank disc 42 on drive shaft 19, Fig. 2, connected by rod 43 with the crank arm 44 of a one-way drive clutch 45 such as the roller clutches shown in Borton Patent 2,397,833 of April 2, 1946, and Koch Patent 2,569,108 of September 25, 1951, on shaft 46 of the feed roll. This clutch, which may be a simple one-way roll clutch, is faced to turn the feed roll downwardly, in Fig. 3, in the same direction as the expeller roll in the stroke of the crank pin 41 in one direction and allow the feed roll to remain at rest in movement of the crank pin in the opposite direction.

The charge of the material extruded by the blade in this invention, is cut off by a rotating wire 47, journalled in a frame 48 and driven from a motor 49, Fig. 5, connected by belt 50 with pulley 51 on shaft 52, the latter carrying pulley 53 connected to belt 54 with pulley 55 on the journalled end portion of the wire.

This special rotating wire cutoff mechanism is fully illustrated and claimed in copending patent application, Serial No. 4,516, filed January 25, 1960, to which reference is made for more complete understanding of this construction.

The frame 48 is advanced to carry the rotating wire close to or actually in contact with the extruding nozzles as indicated in Figs. 3 and 4 and is then lowered to clear the nozzles on the return stroke back to the first position.

These movements are effected from a face cam 56, Fig. 2, on drive shaft 19 operating a link 57 connected with an arm 58 on rock shaft 59, the latter having dependent arms 60 on opposite ends of the same, Figs. 1, 2 and 5, pivotally connected at 61 with the wire carrying frame, lowering and raising action of the frame being accomplished by the cam track 62, Fig. 5, on crank disk 42, actuating link 63 carrying guide cam 64 for the pin or roll 65 on the outer end extension 72 of the wire carrying frame. The push rod 63 is shown guided for vertical movement in bracket 66 and as held in coopera- tive engagement with the cam by spring 67.

The guide cam 64 is curved to hold the wire substantially in engagement with the nozzles 13 during forward cut-off movement and then to lower the wire clear of the nozzles while the wire carrying frame is being retracted.

The link 30 for projecting and retracting the expeller blade is shown as having a turnbuckle 68 by which the operating position of the blade may be determined.

Similarly the connecting rod or link 57 for projecting and retracting the cut-off wire is shown as having an interposed turnbuckle 69 by which operating positions of the wire may be fixed.

The feed roll link 43 similarly may have a turnbuckle 70 interposed therein for adjustment of the feed roll action.

The opposed feed roll 8 and expeller roll 9 engage the stock at opposite sides and cooperatively draw the stock and feed it downwardly in the downwardly rotating motion of these rolls. The expeller roll is of lesser diameter than the feed roll so that the upward, return motion of the expeller roll, when the blade is retracted, does not exert any objectionable upward lifting effect on the material. At such time the feed roll is at rest, tending to hold the stock in its downwardly advanced position.

The blade 15 is projected at the commencement of the downward rocking movement of the expeller roll, thus to cut off a definite charge below the main supply of material and to then advance that charge and extrude it through the die nozzle or nozzles. Usually there will be a row of such nozzles, with the rolls and blade long enough to feed all such nozzles.

In handling the stock this way the quality of the material is maintained and the quantity fed is kept substantially constant.

The rotating wire 47 by contact or close relation with the nozzle tips cuts the material quickly cleanly in accurate size charges. On the back stroke the wire is lowered so as not to touch the nozzles or possibly exert a drag on the material in the mouth of the nozzles.

The feed roll 8 is timed to advance the material and prevent any void in the supply to the cut off blade. During the time that the blade is lowering over the face of the guide 17 from the full line to the dotted line position shown in Fig. 3, the feed roll is turning downward to carry more material down over the top of the blade so that after the blade has reached its lowest position and been retracted, as in Fig. 4, the supply channel 10 will be filled, ready for the next cut off action.

The machine is of relatively simple construction for the results accomplished. All the cams required for the different movements are mounted on the one drive shaft 19. This shaft may be driven from a motor connected with it by a sprocket gear or the like as indicated at 71 in Fig. 2.

What is claimed is:

1. Candy extruding machine comprising the combination of opposed rolls spaced from each other to provide a guide channel therebetween, one of said rolls having a diametrical slot therein, an expeller blade slidingly guided in said slot and cooperative with the opposed roll to advance material through said channel, means for oscillating said slotted roll, means for projecting and retracting said expeller blade in said slotted roll at the ends of the oscillating movements of said roll into and out of cooperative relation with the surface of said opposed roll and means for rotating said opposed roll in the same direction in time with the downward oscillating movements of said blade in its projected position.

2. Candy extruding machine comprising the combination of opposed rolls spaced from each other to provide a guide channel therebetween, one of said rolls having a diametrical slot therein, an expeller blade slidingly guided in said slot and cooperative with the opposed roll to advance material through said channel, means for oscillating said slotted roll, means for projecting and retracting said expeller blade in said slotted roll at the ends of the oscillating movements of said roll into and out of cooperative relation with the surface of said opposed roll and means for rotating said opposed roll in the same direction in time with the downward oscillating movements of said blade in its projected position and a stationary arcuate guide below said opposing roll curved at one side in close fiting relation to said roll and curved at the opposite side on an arc corresponding to the arcuate travel of said expeller blade and in cooperative relation with the end of said expeller blade in its projected position.

3. Candy extruding machine comprising the combination of opposed rolls spaced from each other to provide a guide channel therebetween, one of said rolls having a diametrical slot therein, an expeller blade slidingly guided in said slot and cooperative with the opposed roll to advance material through said channel, means for oscillating said slotted roll, means for projecting and retracting said expeller blade in said slotted roll at the ends of the oscillating movements of said roll into and out of cooperative relation with the surface of said opposed roll and means for rotating said opposed roll in the same direction in time with the downward oscillating movements of said blade in its projected position, a die nozzle at the lower end of said guide channel, a rotating cut off wire mounted to rotate on its own axis, means for rotating said wire on its axis and means for advancing said rotating cut off wire across the end of said nozzle.

4. Candy extruding machine comprising the combination of opposed rolls spaced from each other to provide a guide channel therebetween, one of said rolls having a diametrical slot therein, an expeller blade slidingly guided in said slot and cooperative with the opposed roll to advance material through said channel, means for oscillating said slotted roll, means for projecting and retracting said expeller blade in said slotted roll at the ends of the oscillating movements of said roll into and out of cooperative relation with the surface of said opposed roll and means for rotating said opposed roll in the same direction in time with the downward oscillating movements of said blade in its projected position, said means for projecting and retracting said expeller blade including links mounted for movement toward and away from said slotted roll, said links having arcuate slots therein and said blade having elements engaged in said slots.

5. The invention according to claim 1 in which said means for rotating said opposing roll includes a one-way drive clutch and means for oscillating the same to drive said roll in one direction only.

6. An extruding machine comprising the combination of a one-way rotating feed roll and an opposed oscillating expeller roll journalled on horizontal axes and spaced to provide a downwardly feeding guide channel between them, means for intermittently turning said feed roll in the downwardly feeding direction of said guide channel and for resting said feed roll in intervals between said downwardly feeding movements, means for oscillating said expeller roll downwardly in time with the downward movements of said feed roll and upwardly in the times of rest of said feed roll, an expeller blade slidingly guided in said expeller roll for projecting movement across said guide channel into cooperative relation with said feed roll and for retractive movement clear of said guide channel and means for retracting said expeller blade in the upwardly oscillating movement of said expeller roll while the feed roll is at rest and for projecting said expeller blade into cooperative relation with said feed roll when said feed roll is in the downwardly rotating movements of the same.

References Cited in the file of this patent

UNITED STATES PATENTS

| | | |
|---|---|---|
| 1,657,457 | Copland | Jan. 31, 1928 |
| 1,879,327 | Kremmling | Sept. 27, 1932 |
| 2,488,046 | Werner et al. | Nov. 15, 1949 |
| 2,754,773 | Froidevaux | July 17, 1956 |